US009787668B1

(12) United States Patent
Marathe et al.

(10) Patent No.: US 9,787,668 B1
(45) Date of Patent: Oct. 10, 2017

(54) SENSITIVE USER INFORMATION MANAGEMENT SYSTEM AND METHOD

(71) Applicant: LinkedIn Corporation, Mountain View, CA (US)

(72) Inventors: Nikhil Marathe, Sunnyvale, CA (US); Arvind Mani, Los Altos, CA (US); Ganesh Krishnan, Fremont, CA (US)

(73) Assignee: LinkedIn Corporation, Sunnyvale, CA (US)

( * ) Notice: Subject to any disclaimer, the term of this patent is extended or adjusted under 35 U.S.C. 154(b) by 101 days.

(21) Appl. No.: 14/816,949

(22) Filed: Aug. 3, 2015

(51) Int. Cl.
*H04L 29/06* (2006.01)
*G06F 21/62* (2013.01)
*G06F 21/60* (2013.01)
*H04L 9/32* (2006.01)

(52) U.S. Cl.
CPC ........ *H04L 63/0823* (2013.01); *G06F 21/602* (2013.01); *G06F 21/6245* (2013.01); *H04L 9/3263* (2013.01); *H04L 63/0435* (2013.01); *H04L 63/102* (2013.01)

(58) Field of Classification Search
CPC ............... H04L 63/102; H04L 63/0425; H04L 63/0823; H04L 9/3262
See application file for complete search history.

(56) References Cited

U.S. PATENT DOCUMENTS

| | | | | |
|---|---|---|---|---|
| 6,314,425 | B1 * | 11/2001 | Serbinis | G06F 17/3089 |
| 2007/0118740 | A1 * | 5/2007 | Deishi | H04L 63/0823 |
| | | | | 713/158 |
| 2007/0289002 | A1 * | 12/2007 | van der Horst | G06F 21/42 |
| | | | | 726/9 |
| 2009/0106550 | A1 * | 4/2009 | Mohamed | H04L 63/045 |
| | | | | 713/156 |
| 2011/0126274 | A1 * | 5/2011 | Sadeckas | G06F 21/335 |
| | | | | 726/7 |

(Continued)

OTHER PUBLICATIONS

T. Dierks et al., "The Transport Layer Security (TLS) Protocol Version 1.2", Network Working Group, dated Aug. 2008, 209 pages.

(Continued)

*Primary Examiner* — Hadi Armouche
*Assistant Examiner* — Sher A Khan
(74) *Attorney, Agent, or Firm* — Hickman Palermo Becker Bingham LLP; Adam C. Stone

(57) ABSTRACT

Sensitive user information management system and method. In accordance with some embodiments of the subject innovations, a RESTful "custodial" web service is provided to online service applications of an online service for storing and retrieving sensitive user information. More particularly, the custodial web service offers an operational interface to the online service applications accessible over a data network. The operational interface comprises two operations: STORE and RETRIEVE. The STORE operation allows an online service application to store sensitive user information with the custodial web service. The RETRIEVE operation allows the online service application to later retrieve the sensitive user information from the custodial web service. The custodial web service also ensures that received sensitive user information is cryptographically encrypted when in the custody of the web service.

16 Claims, 6 Drawing Sheets

(56) References Cited

U.S. PATENT DOCUMENTS

| | | | |
|---|---|---|---|
| 2012/0084847 A1* | 4/2012 | Balasubramanian | G06F 21/6218 726/7 |
| 2012/0204032 A1* | 8/2012 | Wilkins | H04L 9/006 713/170 |
| 2013/0262867 A1* | 10/2013 | Evancich | H04L 9/3226 713/168 |
| 2013/0291076 A1* | 10/2013 | Duryee | H04L 63/0884 726/6 |
| 2014/0006773 A1* | 1/2014 | Chazalet | H04L 63/0428 713/150 |
| 2014/0007177 A1* | 1/2014 | Buck | H04L 63/20 726/1 |
| 2014/0082715 A1* | 3/2014 | Grajek | H04L 63/0815 726/8 |
| 2014/0201824 A1* | 7/2014 | Agbabian | G06F 21/6245 726/6 |
| 2014/0337614 A1* | 11/2014 | Kelson | H04L 63/168 713/152 |
| 2015/0200934 A1* | 7/2015 | Naguib | G06F 21/57 713/2 |
| 2015/0350196 A1* | 12/2015 | Toyonaga | H04L 63/0876 713/156 |
| 2015/0373013 A1* | 12/2015 | Gupta | H04L 63/0823 726/10 |
| 2016/0072788 A1* | 3/2016 | Chhabra | G06F 9/44526 726/7 |
| 2016/0219000 A1* | 7/2016 | Park | H04L 51/046 |
| 2016/0224801 A1* | 8/2016 | Yu | G06F 21/45 |
| 2016/0261581 A1* | 9/2016 | Wang | H04L 63/0272 |

OTHER PUBLICATIONS

S. Turner et al., "Prohibiting Secure Sockets Layer (SSL) Version 2.0", Internet Engineering Task Force (IETF), dated Mar. 2011, 9 pages.

R. Fielding et al., "Hypertext Transfer Protocol—HTTP/1.1", Network Working Group, dated Jun. 1999, 353 pages.

Fielding et al., "Principled Design of theModernWeb Architecture", dated 2002, 10 pages.

\* cited by examiner

SENSITIVE USER INFORMATION MANAGEMENT SYSTEM AND METHOD

TECHNICAL FIELD

The subject innovations relate generally to managing sensitive user information, such as, for example, user credential information, in a networked computing environment and, more particularly, to securely storing and later accessing sensitive user information in a networked computing environment.

BACKGROUND

The first web sites were largely implemented with only two "tiers" of computers. Requests from users' web browsers were mainly handled by a first tier of web server computers. In some instances, a web server computer in the first tier would need to request data from a database server in the second tier of computers in order to formulate and send an appropriate response to the user's request. Over time, a third tier, commonly known as the "application tier", was added in between the web server tier and the database tier. In both cases, protecting sensitive user information, such as user credential information, that the web site receives was relatively simple because the overall computing environment was limited and clearly defined.

With the ever-increasing popularity of the Internet, more and more online services, including web sites, are implemented as complex, large-scale distributed computer systems. Today, many online services have tens of online service applications or more providing end-user functionality executing on hundreds of computer servers or more in multiple data center facilities. Further, online service applications may be developed and administered by different engineering teams, often with little or no coordination between teams.

As more and more online services are implemented as large-scale distributed computer systems, a whole new set of challenges face online service developers and administrators: these previously centralized online services developed and administered by only a few or a small number of people are now composed of many online service applications developed and administered by multiple engineering teams. A particular set of challenges involves protecting sensitive user information that an online service application of the online service receives. Such sensitive user information may include, for example, user credential information (e.g., a password of the user or an authentication token of the user), personal financial information (e.g., a bank account number of the user), or certain personally identifiable information (PII) or certain sensitive personal information (SPI) (e.g., the user's social security number or the maiden name of the user's mother).

Often an online service application may need to store sensitive user information for later access. For example, consider a first online service that accesses a third-party online service on behalf of a user. For example, the third-party online service may be a third-party social networking service and the user may have granted the first online service permission to post status updates on behalf of the user to the user's news feed as operated by the third-party social networking service. As part of the user granting permission to the first online service, the first online service application may obtain an access token or other authorization information that represents the user's permission to share access to their account held with the third-party online service with the first online service. Upon obtaining the access token, the first online service may store the access token in a secure manner until it is needed at a later time to access the third-party online service on the user's behalf. If the first online service is careless with the access token by not storing the access token in a secure manner or allows the access token to fall into the hands of unauthorized persons, then users may lose trust in the first online service.

One possible way for an online service to protect sensitive user information is to cryptographically encrypt the information and the store the information in an encrypted format until it is needed by at a later time. In this way, if the encrypted information is stolen, the sensitive user information cannot be accessed without the encryption key. Unfortunately, different online service applications and different online service application engineering teams may employ different techniques for encrypting sensitive user information. For example, different engineering teams may use different levels of encryption key entropy or different encryption key rotation schedules. The result is an online service composed of many different online service applications that protect sensitive user information in various ad-hoc manners with the overall effect of providing less security and protection of users' sensitive information.

What is needed then is a system implementing a methodology that solves the basic problem of protecting sensitive user information is a consistent manner. Ideally, the solution would relieve online service applications of at least some of the burden of protecting sensitive user information that the online service applications receive. The subject innovations provide a solution for these and other needs.

SUMMARY

In accordance with some embodiments described below, a method for storing sensitive user information for subsequent access by a client is provided. The method is performed by one or more computer servers. Each of the computer servers includes one or more processors and memory. The method includes: receiving a network request over a cryptographically secured network communications channel established with a client, the request having a payload, the payload comprising the sensitive user information and an identifier of a data store compartment; verifying, based on the data store compartment identifier and client identifying information in a client certificate associated with the cryptographically secured network communications channel, that the client has permission to access the data store compartment; storing the sensitive user information in the data store compartment; and returning a token to the client over the cryptographically secured network communications channel for use in later retrieving the sensitive user information from the data store compartment.

In accordance with some embodiments described below, a method for providing access to sensitive user information to a client. The method is performed by one or more computer servers. Each of the computer servers includes one or more processors and memory. The method includes: receiving a network request over a cryptographically secured network communications channel established with the client, the request having a payload, the payload comprising a token and an identifier of a data store compartment; verifying, based on the data store compartment identifier and client identifying information in a client certificate associated with the cryptographically secured network communications channel, that the client has permission to access the data store compartment; and returning sensitive user information associated with the token in the data store compartment to the client over the cryptographically secured network communications channel.

In accordance with some embodiments, a method for storing and providing access to sensitive user information. The method is performed by one or more computer servers. Each of the computer servers includes one or more processors and memory. The method includes: receiving a first network request over a first cryptographically secured network communications channel established with a first client, the first request having a first payload, the first payload comprising the sensitive user information and an identifier of a data store compartment; verifying, based on the data store compartment identifier and client identifying information in a first client certificate associated with the first cryptographically secured network communications channel, that the first client has permission to access the data store compartment; storing the sensitive user information in the data store compartment; returning a token to the first client over the first cryptographically secured network communications channel for use in later retrieving the sensitive user information from the data store compartment; receiving a second network request over a second cryptographically secured network communications channel established with a second client, the second request having a second payload, the second payload comprising the token and the identifier of the data store compartment; verifying, based on the data store compartment identifier and client identifying information in a second client certificate associated with the second cryptographically secured network communications channel, that the second client has permission to access the data store compartment; returning the sensitive user information to the second client over the second cryptographically secured network communications channel; and wherein the sensitive user information is associated with the token in the data store compartment.

In accordance with some embodiments described above, the subject innovations encompass one or more non-transitory computer-readable media storing one or more computer programs for execution by one or more processors of one or more computer servers. The one or more computer programs comprising instructions for performed any of the foregoing methods.

In accordance with some embodiments described above, the subject innovations encompass a system comprising one or more processors of one or more computer servers and one or more computer-readable media storing one or more computer programs for execution by the one or more processors. The one or more computer programs comprising instructions for performing any of the foregoing methods.

BRIEF DESCRIPTION OF THE DRAWINGS

The aforementioned embodiments of the invention as well as additional embodiments will be more clearly understood as a result of the following detailed description of the various aspects of the subject innovations when taken in conjunction with the drawings. Like reference numerals refer to corresponding parts throughout the several views of the drawings.

DETAILED DESCRIPTION

Figure 1:
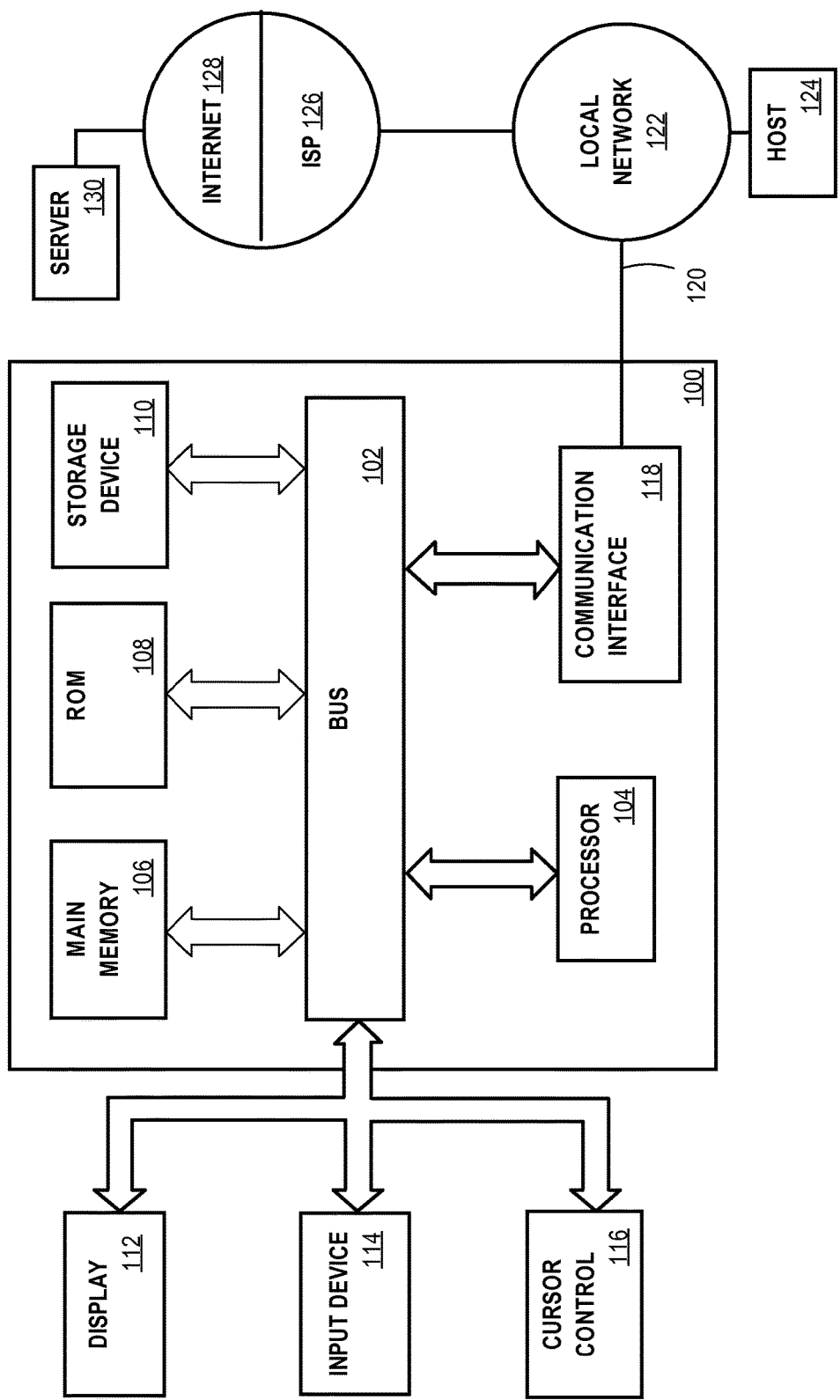
FIG. 1 is a very general block diagram of a computing device in which software-implemented processes of the subject innovations may be embodied.

In the following description, for the purposes of explanation, numerous specific details are set forth in order to provide a thorough understanding of the subject innovations. It will be apparent, however, that the subject innovations may be practiced without these specific details. In other instances, well-known structures and devices are shown in block diagram form in order to avoid unnecessarily obscuring the subject innovations.

Glossary

The following definitions are offered for purposes of illustration, not limitation, in order to assist with understanding the discussion that follows.

Digital Certificate: A digital certificate, also known as a public key certificate, is an electronic document used to prove ownership of a public key. A digital certificate includes the public key, information about the owner of the public key, and a digital signature of a signer of the certificate that has verified that the digital certificate's contents are correct. If the digital signature of the signer is valid, and a recipient examining the digital certificate trusts the signer, then the recipient knows that the public key belongs to the owner. The recipient may then use the public key to verify a digital signature of the owner or to encrypt and send data to the owner that only the owner can decrypt. One widely-used electronic format of a digital certificate is the ITU Telecommunication Standardization Sector (ITU-T) X.509 standard HTTP: HTTP stands for the hypertext transfer protocol, which is the underlying communication protocol used retrieving web pages on the Internet. HTTP defines how messages are formatted and transmitted, and what actions web servers and web browsers should take in response to various commands. Further description of HTTP is available in "RFC: 2616 Hypertext Transfer Protocol—HTTP/1.1," (June 1999), the disclosure of which is hereby incorporated by reference. A copy of RFC 2616 is available via the Internet (e.g., currently at tools.ietf.org/rfc/rfc2616.txt).

HTTPS: HTTPS stands for HTTP over TLS, HTTP over SSL, or HTTP secure. HTTPS is a communications protocol for secure communication over the Internet that results from layering HTTP on top of the secure sockets layer (SSL) protocol or the transport layer security (TLS) protocol. Further description of TLS is available in "RFC: 5246 The Transport Layer Security (TLS) Protocol Version 1.2," (August 2008) and updated by "RFC: 6176 Prohibiting Secure Sockets Layer (SSL) Version 2.0," (March 2011), the disclosures of each of which are hereby incorporated by reference. Copies of RFC 5246 and 6176 are available via the Internet (e.g., currently at tools.ietf.org/rfc/rfc5246.txt and tools.ietf.org/rfc/rfc6176.txt, respectively). TLS is based on earlier SSL specifications developed by NETSCAPE COMMUNICATIONS for adding the HTTPS protocol to their NAVIGATOR web browser.

REST: REST stands for representational state transfer and is a software architecture consisting of guidelines and best practices for creating scalable web services. RESTful computer systems typically communicate over HTTP or HTTPS using HTTP request methods such as GET, POST, PUT, etc. Further description of REST is available in the paper by Roy T. Fielding and Richard N. Taylor, "Principled Design of the Modern Web Architecture," ACM Transactions on Internet Technology, Vol. 2, No. 2, May 2002, pp. 115-150, the entire contents of which are hereby incorporated by reference.

Public-key Cryptography: Public-key cryptography, also known as asymmetric encryption, encompasses a class of cryptography algorithms that use a pair of separate encryption keys. Each pair of keys includes a secret key (also called a "private" key) and a "public" key. Well-known public-key algorithm include the Diffie-Hellman key exchange (D-H), the Digital Signature Algorithm (DSA), and RSA.

Symmetric Encryption: Symmetric encryption, also known as secret key encryption, encompasses a class of cryptography algorithms that use the same or equivalent encryption keys for both encrypting data and decrypting the encrypted data. Well-known symmetric-key encryption algorithms include the Advanced Encryption Standard (AES), CAST-128, and the Triple Data Encryption Algorithm (3DES).

General Overview

Given the limitations of current ad-hoc sensitive user information protection approaches, a centralized approach is preferable. In accordance with some embodiments of the subject innovations, a RESTful "custodial" web service is provided to online service applications of an online service for storing and retrieving sensitive user information. More particularly, the custodial web service offers an operational interface to the online service applications accessible over a data network. The operational interface comprises two operations: STORE and RETRIEVE. The STORE operation allows an online service application to store sensitive user information with the custodial web service. The RETRIEVE operation allows the online service application to later retrieve the sensitive user information from the custodial web service.

According to some embodiments, sensitive user information stored with the custodial web service is encrypted by the custodial web service using symmetric encryption. Since the custodial web service encrypts the sensitive user information it receives from online service applications, the online service applications themselves are relieved of the responsibility of encrypting the sensitive user information they provide to the custodial web service. Moreover, encryption of sensitive user information is centralized at the custodial web service. This centralization, by its nature, makes it easier to ensure consistency adhering to good encryption practices such as those pertaining to encryption key entropy and key rotation.

While in some embodiments, sensitive user information is not encrypted by the online service applications before it is provided to the custodial web service, the sensitive user information is encrypted before it is provided to the custodial web service in other embodiments. Thus, in this description, when referring to sensitive user information provided to the custodial web service (e.g., via the STORE operation), such references are intended to encompass both implementations where the sensitive user information is provided to the custodial web service unencrypted and implementations where the sensitive user information is provided in an encrypted format, unless the context clearly indicates otherwise.

According to some embodiments, the custodial web service stores sensitive user information it receives from online service applications in a compartmentalized data store. Access to each compartment is controlled by the custodial web service. As a result, one online service application may not be allowed to access a compartment that is accessible by another online service application. Compartmentalization of the data store provides extra security. For example, the custodial web service may allow an online service application that handles payment processing to store and access bank account numbers in a "payment" compartment but not allow other online service applications of the online service to access that compartment. By compartmentalizing the data store in which sensitive user information is stored, the custodial web service provides a form a secure multitenancy in that the custodial web service may serve multiple online service applications of the online service while at the same time preventing unauthorized online service applications from accessing the sensitive user information of other unrelated online service applications.

These and other embodiments are described in greater detail below with reference to the drawings. Before discussing the subject innovations in greater detail, however, basic computer hardware and software for implementing the subject innovations will be first be described.

Basic Computer-Based Implementation

Referring to the figures, exemplary embodiments of the subject innovations will now be described. The following description will focus on embodiments implemented in client and/or server software operating in a network-connected environment running under an operating system such as a UNIX operating system. The subject innovations, however, are not limited to any one particular implementation or any one particular environment. Instead, those skilled in the art would find that the system and methods of the subject innovations may be advantageously embodied on a variety of different computing platforms, including, LINUX, MICROSOFT WINDOWS, ANDROID, MAC OS, IOS, or the like. Accordingly, the description of the exemplary embodiments that follows is for purposes of illustration not limitation. The exemplary embodiments are primarily described with reference to block diagrams or flowcharts. As to the flowcharts, each block within the flowchart represents both a method step and apparatus element for performed the method step. Depending on the implementation, the corresponding apparatus element may be configured in hardware, software, firmware or a combination thereof.

Basic Computing Device

Referring now to FIG. 1, it is a block diagram that illustrates a basic computing device 100 in which software-implemented processes of the subject innovations may be embodied. Computing device 100 and its components, including their connections, relationships, and functions, is meant to be exemplary only, and not meant to limit implementations of the subject innovations. Other computing devices suitable for implementing the subject innovations may have different components, including components with different connections, relationships, and functions.

Computing device 100 may include a bus 102 or other communication mechanism for addressing main memory 106 and for transferring data between and among the various components of device 100.

Computing device 100 may also include one or more hardware processors 104 coupled with bus 102 for processing information. A hardware processor 104 may be a general purpose microprocessor, a system on a chip (SoC), or other processor suitable for implementing the subject innovations.

Main memory 106, such as a random access memory (RAM) or other dynamic storage device, also may be coupled to bus 102 for storing information and instructions to be executed by processor(s) 104. Main memory 106 also may be used for storing temporary variables or other intermediate information during execution of software instructions to be executed by processor(s) 104.

Such software instructions, when stored in non-transitory storage media accessible to processor(s) 104, render computing device 100 into a special-purpose computing device that is customized to perform the operations specified in the instructions. The terms "instructions", "software", "software instructions", "program", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 100 also may include read only memory (ROM) 108 or other static storage device coupled to bus 102 for storing static information and instructions for processor(s) 104.

One or more mass storage devices 110 may be coupled to bus 102 for persistently storing information and instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 110 (e.g., the main hard disk for the device) stores a body of program and data for directing operation of the computing device, including an operating system, user application programs, driver and other support files, as well as other data files of all sorts.

Computing device 100 may be coupled via bus 102 to display 112, such as a liquid crystal display (LCD) or other electronic visual display, for displaying information to a computer user. In some configurations, a touch sensitive surface incorporating touch detection technology (e.g., resistive, capacitive, etc.) may be overlaid on display 112 to form a touch sensitive display for communicating touch gesture (e.g., finger or stylus) input to processor(s) 104.

An input device 114, including alphanumeric and other keys, may be coupled to bus 102 for communicating information and command selections to processor 104. In addition to or instead of alphanumeric and other keys, input device 114 may include one or more physical buttons or switches such as, for example, a power (on/off) button, a "home" button, volume control buttons, or the like.

Another type of user input device may be a cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

While in some configurations, such as the configuration depicted in FIG. 1, one or more of display 112, input device 114, and cursor control 116 are external components (i.e., peripheral devices) of computing device 100, some or all of display 112, input device 114, and cursor control 116 are integrated as part of the form factor of computing device 100 in other configurations.

Functions of the disclosed systems, methods, and modules may be performed by computing device 100 in response to processor(s) 104 executing one or more programs of software instructions contained in main memory 106. Such instructions may be read into main memory 106 from another storage medium, such as storage device(s) 110. Execution of the software program instructions contained in main memory 106 cause processor(s) 104 to perform the functions of the disclosed systems, methods, and modules.

While in some implementations, functions of the disclosed systems and methods are implemented entirely with software instructions, hard-wired or programmable circuitry of computing device 100 (e.g., an ASIC, a FPGA, or the like) may be used in place of or in combination with software instructions to perform the functions, according to the requirements of the particular implementation at hand.

The term "storage media" as used herein refers to any non-transitory media that store data and/or instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 110. Volatile media includes dynamic memory, such as main memory 106. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 102. Transmission media can also take the form of acoustic or light waves, such as those generated during radio-wave and infra-red data communications.

Various forms of media may be involved in carrying one or more sequences of one or more instructions to processor(s) 104 for execution. For example, the instructions may initially be carried on a magnetic disk or solid-state drive of a remote computer. The remote computer can load the instructions into its dynamic memory and send the instructions over a telephone line using a modem. A modem local to computing device 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor(s) 104 retrieves and executes the instructions. The instructions received by main memory 106 may optionally be stored on storage device(s) 110 either before or after execution by processor(s) 104.

Computing device 100 also may include one or more communication interface(s) 118 coupled to bus 102. A communication interface 118 provides a two-way data communication coupling to a wired or wireless network link 120 that is connected to a local network 122 (e.g., Ethernet network, Wireless Local Area Network, cellular phone network, Bluetooth wireless network, or the like). Communication interface 118 sends and receives electrical, electromagnetic, or optical signals that carry digital data streams representing various types of information. For example, communication interface 118 may be a wired network interface card, a wireless network interface card with an integrated radio antenna, or a modem (e.g., ISDN, DSL, or cable modem).

Network link(s) 120 typically provide data communication through one or more networks to other data devices. For example, a network link 120 may provide a connection through a local network 122 to a host computer 124 or to data equipment operated by an Internet Service Provider (ISP) 126. ISP 126 in turn provides data communication services through the world wide packet data communication network now commonly referred to as the "Internet" 128. Local network(s) 122 and Internet 128 use electrical, electromagnetic or optical signals that carry digital data streams. The signals through the various networks and the signals on network link(s) 120 and through communication interface(s) 118, which carry the digital data to and from computing device 100, are example forms of transmission media.

Computing device 100 can send messages and receive data, including program code, through the network(s), network link(s) 120 and communication interface(s) 118. In the Internet example, a server 130 might transmit a requested code for an application program through Internet 128, ISP 126, local network(s) 122 and communication interface(s) 118.

The received code may be executed by processor 104 as it is received, and/or stored in storage device 110, or other non-volatile storage for later execution.

Basic Software System

Figure 2:
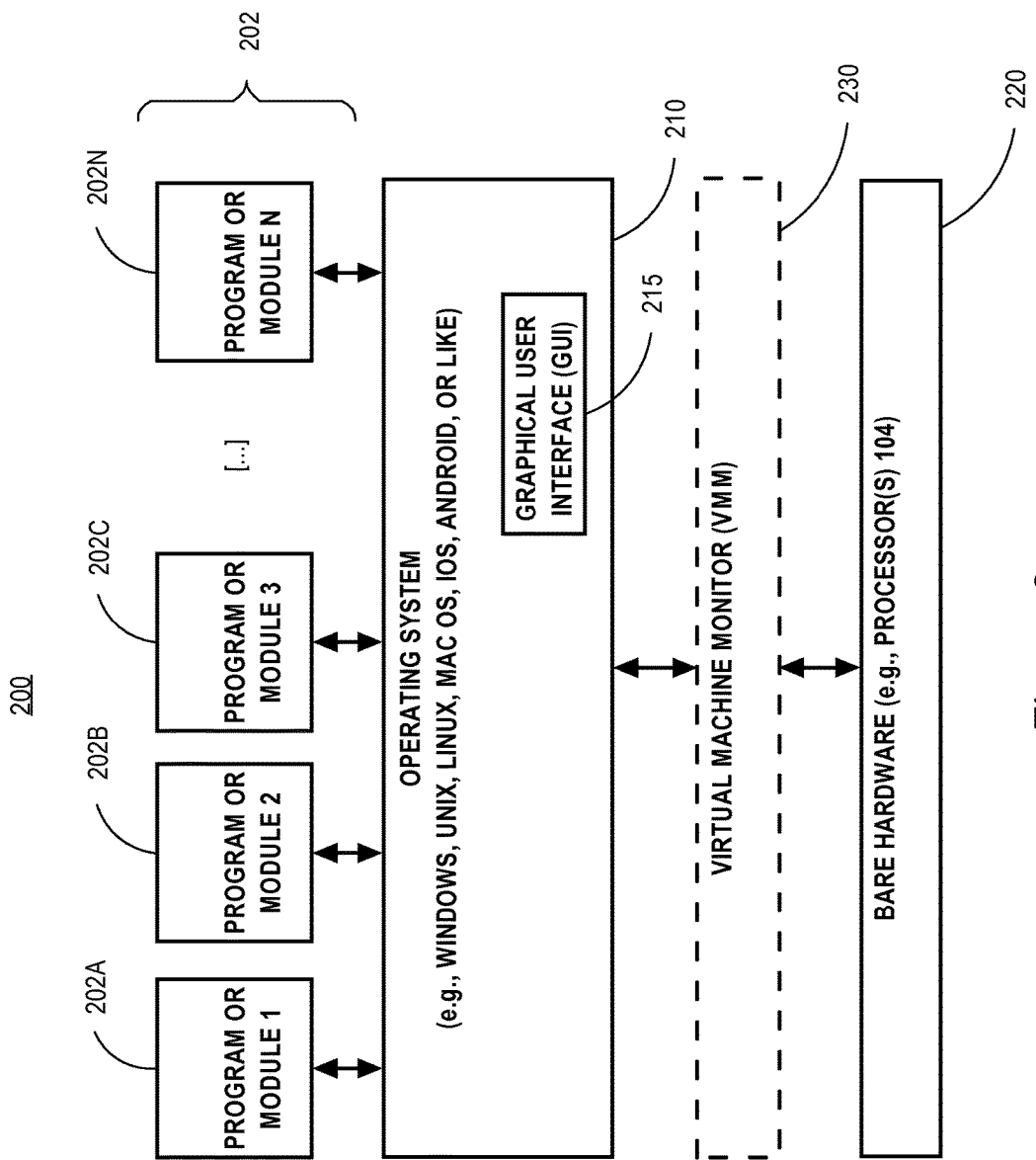
FIG. 2 is a block diagram of a basic software system for controlling the operation of the computing device.

FIG. 2 is a block diagram of a basic software system 200 that may be employed for controlling the operation of computing device 100. Software system 200 and its components, including their connections, relationships, and functions, is meant to be exemplary only, and not meant to limit implementations of the subject innovations. Other software systems suitable for implementing the subject innovations may have different components, including components with different connections, relationships, and functions.

In various embodiments, software system 200 is provided for directing the operation of computing device 100. Software system 200, which may be stored in system memory (RAM) 106 and on fixed storage (e.g., hard disk or flash memory) 110, includes a kernel or operating system (OS) 210. The OS 210 manages low-level aspects of computer operation, including managing execution of processes, memory allocation, file input and output (I/O), and device I/O. One or more application programs, represented as 202A, 202B, 202C . . . 202N in FIG. 2, may be "loaded" (e.g., transferred from fixed storage 110 into memory 106) for execution by the system 200. The applications or other software intended for use on device 200 may also be stored as a set of downloadable computer-executable instructions, for example, for downloading and installation from an Internet location (e.g., a Web server).

Software system 200 may include a graphical user interface (GUI) 215, for receiving user commands and data in a graphical (e.g., "point-and-click" or "touch gesture") fashion. These inputs, in turn, may be acted upon by the system 200 in accordance with instructions from operating system 210 and/or application(s) 202. The GUI 215 also serves to display the results of operation from the OS 210 and application(s) 202, whereupon the user may supply additional inputs or terminate the session (e.g., log off).

OS 210 can execute directly on the bare hardware 220 (e.g., processor(s) 104) of device 100. Alternatively, a hypervisor or virtual machine monitor (VMM) 230 may be interposed between the bare hardware 220 and the OS 210. In this configuration, VMM 230 acts as a software "cushion" or virtualization layer between the OS 210 and the bare hardware 220 of the device 100.

VMM 230 instantiates and runs one or more virtual machine instances ("guest machines"). Each guest machine comprises a "guest" operating system, such as OS 210, and one or more applications, such as application(s) 202, designed to execute on the guest operating system. The VMM 230 presents the guest operating systems with a virtual operating platform and manages the execution of the guest operating systems.

In some instances, the VMM 230 may allow a guest operating system to run as if it is running on the bare hardware 220 of device 100 directly. In these instances, the same version of the guest operating system configured to execute on the bare hardware 220 directly may also execute on VMM 230 without modification or reconfiguration. In other words, VMM 230 may provide full hardware and CPU virtualization to a guest operating system in some instances.

In other instances, a guest operating system may be specially designed or configured to execute on VMM 230 for efficiency. In these instances, the guest operating system is "aware" that it executes on a virtual machine monitor. In other words, VMM 230 may provide para-virtualization to a guest operating system in some instances.

The above-described computer hardware and software is presented for purpose of illustrating the basic underlying computer components that may be employed for implementing the subject innovations. The subject innovations, however, are not necessarily limited to any particular computing environment or computing device configuration. Instead, the subject innovations may be implemented in any type of system architecture or processing environment that one skilled in the art would understand in light of this disclosure as capable of supporting the features and functions of the subject innovations as presented herein.

Network-Connected Computing Environment

Figure 3:
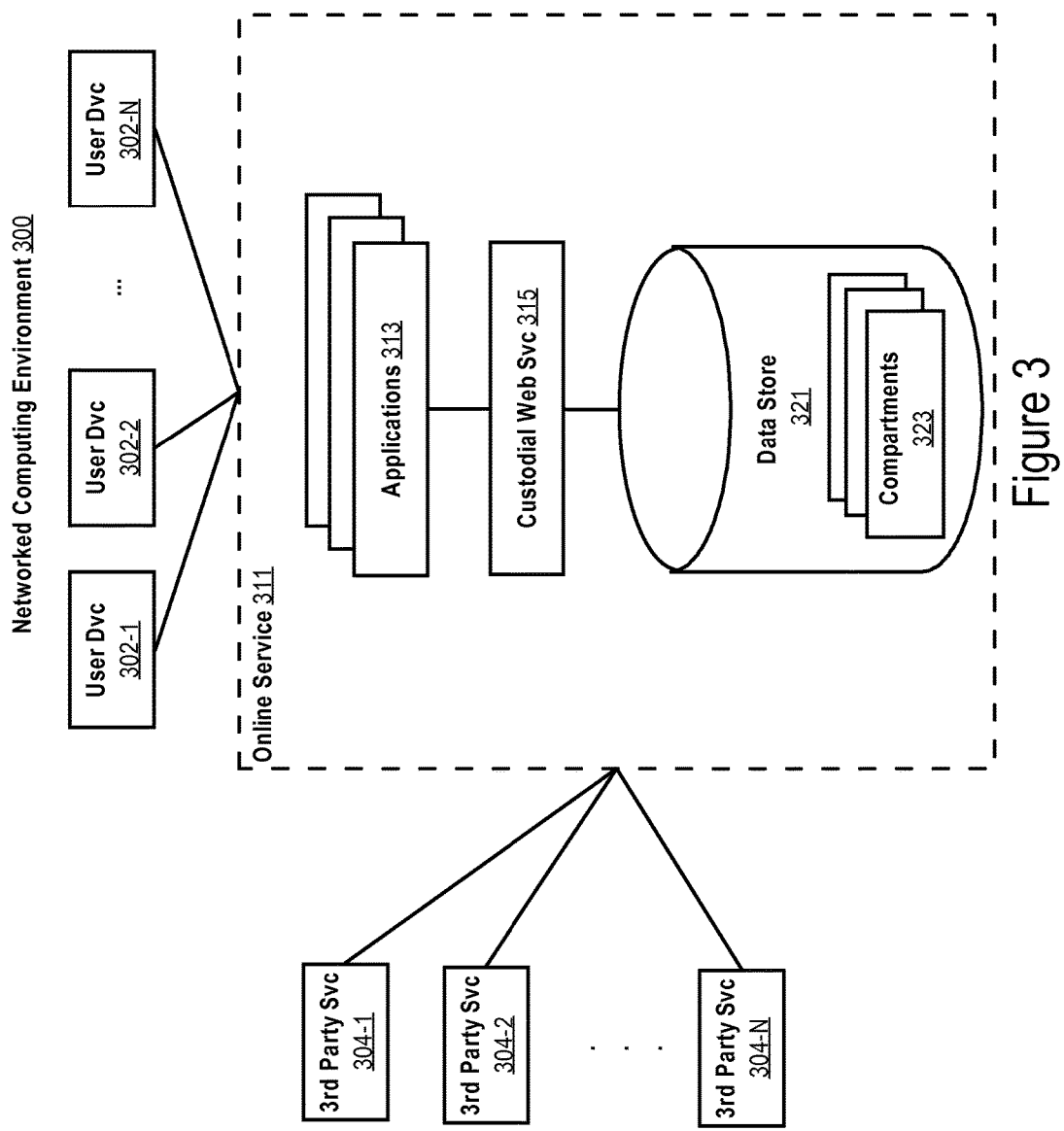
FIG. 3 is a block diagram illustrating a possible networked computing environment in which the subject innovations may be implemented.

While the subject innovations may be embodied in a single stand-alone computing device, the subject innovations may instead be implemented in a network connected computing environment. Referring now to FIG. 3, it is a block diagram of a possible network connected computing environment 300 in which the subject innovations may be implemented. FIG. 3 is provided as merely one example of a possible computing environment in which the subject innovations may be implemented and is not intended to be limiting of the environments in which subject innovations may be implemented. More generally, the subject innovations may be implementing in any computing environment that one skilled in the art would understand in light of this disclosure as capable of supporting the features and functions of the subject innovations as presented herein.

As shown, the environment 300 includes one or more user computing devices 302-1, 302-2 . . . 302-N, one or more third-party online services 304-1, 304-2 . . . 304-N, and online service 311. The online service 311 may obtain sensitive user information pertaining to users of the online service 311 (i.e., users of user computing devices 302) from both the user computing devices 302 and the third-party online services 311. The online service 311 may also generate sensitive user information.

As used herein, sensitive user information encompasses any information pertaining to a user of an online service that is not to be shared or made available by the online service to other users of the online service absent permission from the user. Non-limiting examples of possible sensitive user information include user credential information (e.g., a password of a user or an authentication token of a user), personal financial information (e.g., a bank account number of the user), or certain personally identifiable information (PII) or certain sensitive personal information (SPI) (e.g., a user's social security number or the maiden name of a user's mother). If the user has not given the online service permission to share the user's sensitive user information with other users, then the user trusts the online service to protect the user's sensitive user information from access by other users. The subject innovations provide a solution for the online service to more securely protect sensitive user information while the sensitive user information is in the custody of the online service.

Returning to FIG. 3, a user computing device 302 can be a workspace computer, a mobile computer, a web computer, or other personal computing device. A workspace computer may be a desktop computer, a workstation computer, or other stationary computer, for example. A mobile computer may be a mobile phone, a laptop computer, a tablet computer, or other portable computing device, for example. A web computer can be a workspace computer or a mobile computer configured with conventional web browser application software which is configured to execute on the web computer as an application program (e.g., 202).

The user computing devices 302-1, 302-2 . . . 302-N may send sensitive user information to the online service 311 in the process of using the end-user functionality of the online service 311. For example, user computing devices 302-1, 302-2 . . . 302-N may send sensitive user information to online service 311 as a result of users interacting with web pages served by the online service 311 to the user computing devices 302-1, 302-2 . . . 302-N. The online service 311 may receive the sensitive user information from the user computing devices 302-1, 302-2 . . . 302-N via a data network such as, for example, the Internet. The online service 311 may also receive sensitive user information from the one or more third-party online services 304-1, 304-2 . . . 304-N via a data network such as, for example, the Internet, a wide area network (WAN), or a peering network.

The online service 311 itself includes one or more online service applications 313 that provide end-user functionality to the users of the user computing devices 302-1, 302-2 . . . 302-N. Such end-user functionality may vary depending on the type of the online service 311. As just some examples, an online service application 313 may be a web server, an application server, a database server, a combination thereof, or other software application of the online service 311 configured to provide or support end-user functionality.

An online service application 313 may execute on one or more computer servers of the online service 311. Each such computer server may include basic computing hardware components such as, for example, those of device 100 of FIG. 1. Each computer server may also be configured with a basic software system like, for example, system 200 of FIG. 2. The online service application 313 may execute as one or more application programs (e.g., 202) on one or more computer servers.

Custodial Web Service

The computer servers on which the online service applications 313 execute may be connected to the custodial web service 315 via a data network. The data network may be an Internet Protocol (IP)-based data network. The custodial web service 315 itself may also execute on one or more computer servers like those on which the applications 313 execute. For greater security, the custodial web service 315 and the data network that connects the custodial web service 315 to the applications 313 may be configured to be accessible only within the online service 311 (e.g., only by applications 313) and not accessible by third-party online services 304 or user computing devices 302.

The custodial web service 315 stores sensitive user information in a data store 321. The data store 321 may be implemented by a database management system such as, for example, a conventional database management system such as, for example, a conventional relational database management system (RDBMS). In one non-limiting embodiment, the data store 321 is implemented by a relational database management system and the relational database management system is configured to offer only a limited operational interface to the custodial web service 315 consisting of a few (e.g., four) stored procedures. The stored procedures may correspond, for example, to create, read, update, and delete operations on data in the data store 321. The limited operational interface of the data store 321 makes it more difficult for an attacker to gain access to the sensitive user information stored in the data store 321.

The custodial web service 315 provides a RESTful interface to the applications 313. The interface may be invoked using the HTTP or the HTTPS protocol. Preferably, the HTTPS protocol is used to protect sensitive information as transits the data network between the applications 313 and the custodial web service 315.

According to some embodiments of the subject innovations, the RESTful interface provided by the custodial web service to the applications 313 includes a STORE operation and a RETRIEVE operation. The STORE and RETRIEVE operations may be invoked by an application 313 by sending an HTTP/S request to the custodial web service 315.

According to some embodiments, an application 313 specifies the operation to invoke (i.e., STORE or RETRIEVE) by specifying a corresponding HTTP request method in the HTTP/S request. For example, the application 313 may specify the STORE operation by sending a HTTP/S POST or PUT request and specify the RETRIEVE operation by sending a HTTP/S GET request. In these embodiments, the HTTP request method of the HTTP/S request (i.e., POST, GET, PUT, etc.) reflects whether the application 313 sending the request intends to invoke the STORE operation or the RETRIEVE operation of the custodial web service 315.

According to some embodiments, there two variants of the STORE operation. One variant of the STORE operation is for creating new data/new record in the data store 321. The other variant of the STORE operation is for updating existing data/existing record in the data store 321. Which variant is intended by the application 313 may be specified in the HTTP/S request. For example, an application 313 may send a HTTP/S POST request to specify the variant of the STORE operation for creating new data/new record. Alternatively, the application 313 may send a HTTP/S PUT request to specify the variant for updating existing data/existing record.

According to some embodiments, the HTTP request method is not used to fully specify the type of operation to invoke on the custodial web service 315. Instead, the type of operation to invoke is explicitly specified in the "payload" of the HTTP/S request. The payload of an HTTP/S request includes one or more of the request URI, the request header(s), and the message body of the HTTP/S request. In these embodiments, the type of operation specified in the payload of an HTTP/S request may be independent of the HTTP request method of the HTTP/S request.

The STORE Operation

According to some embodiments, the STORE operation accepts all the following parameters, or a subset or a superset thereof, which may be specified in the HTTP/S request payload:

| Parameter | Description |
| --- | --- |
| Compartment Identifier | An identifier of a compartment in the data store in which to store the Sensitive User Information Value specified in the STORE operation. |
| Secondary Key | A character string value to store in the data store in association with the Sensitive User Information Value. |
| Sensitive User Information Value | The sensitive user information to be stored in the specified compartment and in association with the Secondary Key, if one was specified in the STORE operation. The sensitive user information may be encrypted or unencrypted when passed as a parameter to the STORE operation. More generally, the custodial web service may treat the Sensitive User Information Value passed as a parameter to the STORE operation as opaque data. |
| Expiry Time | A time value that specifies or indicates a maximum amount of time the Sensitive User Information Value stored in data store as a result of the STORE operation is to be stored/retained in the data store starting from the time it is stored in the data set as a result of the STORE operation. The Sensitive User Information Value may be automatically deleted from the data store after the expiry time by the custodial web service or the data store. This parameter is useful if the Sensitive User Information Value has ephemeral characteristics. For example, the Sensitive User Information Value may be a random sequence of characters included in a password reset link (URL) which a user can use to reset his or her password within 24 hours of receiving the link. A password reset application storing the Sensitive User Information Value may specify an expiry time of 24 hours in the future such that if the user does reset his or her password, the random sequence of characters is automatically deleted from the data store without the application having to remember to do so. |

A successful STORE operation returns a Token in the HTTP/S response to the HTTP/S request for the STORE operation. The Token may be used to later retrieve the Sensitive User Information Value that was stored by the custodial web service 315 in the compartment 323 specified in the STORE operation. In some embodiments, the Token is character string data of some byte length (e.g., 64 bytes). The character string data may be appear to be random. In other embodiments, the Token is an integer value or an ordinal number represented as a numerical data type or as character string data.

More generally, the Token returned for a STORE operation may be any data that the custodial web service 315 can use to locate the corresponding Sensitive User Information Value in the data store 321. In some embodiments, the custodial web service 315 can use a Token by itself to locate the corresponding Sensitive User Information Value in the data store 321. In other embodiments, the custodial web service 315 uses a combination of a Token and a Compartment Identifier to locate the corresponding Sensitive User Information Value in the data store 321.

The RETRIEVE Operation

According to some embodiments, the RETRIEVE operation accepts all of the following parameters, or a subset or a superset thereof, which may be specified in the HTTP/S request payload:

| Parameter | Description |
| --- | --- |
| Token | A Token returned from a prior STORE operation. According to some embodiments, the Token is an optional parameter to the RETRIEVE operation. In these embodiments, if a Token is not specified in a RETRIEVE operation, then the RETRIEVE operation must specify a Secondary Key. |
| Compartment Identifier | An identifier of the compartment in the data store in which to the Sensitive User Information Values to retrieve are stored. |
| Secondary Key | If a Token is not specified in a RETRIEVE operation, then a Secondary Key must be specified in the RETRIEVE operation. |

A successful RETRIEVE operation returns one or more Sensitive User Information Values in the HTTP/S response to the HTTP/S request specifying the RETRIEVE operation. In particular, if a Token is specified in the RETRIEVE operation, then the Sensitive User Information Value associated with the Token in the compartment 323 specified in the RETRIEVE operation is returned. If a Secondary Key is specified instead, then all Sensitive User Information Values associated with the Secondary Key in the compartment 323 specified in the RETRIEVE operation are returned.

Compartment Access Control

According to some embodiments, when an application 313 requests a RETRIEVE or STORE operation specifying a Compartment Identifier of a compartment 323, the custodial web service 315 verifies that the application 313 has permission to access the specified compartment 323 before allowing the application 313 to perform the operation against the compartment 323. To authenticate the application 313, the custodial web service 315 may employ public-key cryptography. In particular, the custodial web service 314 may use an identity in a digital certificate presented by the application 313 to the custodial web service 315 when the two parties establish a cryptographically secure network communications channel. Establishment of the cryptographically secure network communications channel may be based on SSL or TLS, for example.

According to some embodiments, the identity in the digital certificate presented by the application 313 to the custodial web service 315 specifies one or both of two pieces of information. A first piece of information specifies a network address with which the application 313 is associated. For example, the network address may be assigned to the computer server on which the application 313 executes. The network address may be a hostname (e.g., a full-qualified or partial Domain Name Service (DNS) hostname) or a numerical network address such as an Internet Protocol (IP) v4 or v6 network address. A second piece of information specifies a service name of the application 313. The service name may be a character string that describes the functionality or class of functionality that the application 313 provides. For example, application(s) 313 of the online service 311 that handle payment processing may be given the service name of "payment" while application(s) 313 of the online service 311 that handle new user registration may be given the service name of "sign-up". In some embodiments, the network address and the service name are stored in extension fields of an X.509 compliant digital certificate that the application 313 presents to the custodial web service 315 when establishing a cryptographically secure network communications channel via SSL or TLS.

The custodial web service 315 may have access to an access control list. The access control list may map network addresses and/or service names from the digital certificates of the applications 313 to sets of one or more identifiers of compartments 323 that the applications 313 have permission to access. For a RETRIEVE or STORE operation received from an application 313, the custodial web service 315 may check the access control list to determine if the Compartment Identifier specified in the operation is in the set of compartment identifiers corresponding to the network address and/or service name presented in the digital certificate of the application 313. If so, then the custodial web service 315 may allow the operation. Otherwise, the custodial web service 315 may deny the operation. As an alternative, the access control list may map compartment identifiers to sets of one or more network addresses and/or service names that have permission to access the compartments 323. In this case, when a RETRIEVE or STORE operation is received from an application 313, the custodial web service 315 may check the access control list if the network address and/or service name in the digital certificate presented by the application 313 is in the set of network addresses and/or service names that have permission to access the compartment 323 specified by the Compartment Identifier in the operation. If so, then the custodial web service 315 may allow the operation. Otherwise, the custodial web service 315 may deny the operation.

According to some embodiments, separate access controls may be specified for the RETRIEVE operation and the STORE operation. Specifically, when an application 313 requests a RETRIEVE or STORE operation specifying a Compartment Identifier of a compartment 323, the custodial web service 315 verifies that the application 313 has permission to perform the specified operation against the specified compartment 323 before allowing the application 313 to perform the operation against the compartment 323, as opposed to merely verifying that the application 313 has access to the compartment 323 before allowing the operation against the compartment 323. To do this, the access control list consulted by the custodial web service 315 may specify separate access permissions for the RETRIEVE and STORE operations. For example, the access control list may specify that a certain service name may perform a STORE operation against a particular compartment 323 but not specify that the service name is allowed to perform a RETRIEVE operation against the particular compartment 323. The result is that an application 313 presenting a digital certificate with that service name will not be allowed to perform a RETRIEVE operation against the particular compartment 323 but will be able to perform a STORE operation against the particular compartment 323.

For auditing purpose, the custodial web service may maintain an access log that records at least unsuccessful attempts to perform a STORE or RETRIEVE operation. An unsuccessful attempt may be a STORE or RETRIEVE operation against a compartment 323 that the requesting application 313 does not have access to according to the access controls on the compartment 323. The access log may be composed of log lines. A log line may correspond to an unsuccessfully attempt. In this case, the log line may specify, among other information, the operation attempted (e.g., STORE or RETRIEVE), the identifier of the compartment 323 that the operation attempted to access, and identifying information about the application 313 that attempted the operation such as, for example, a network address, hostname, or service name associated with the application 313.

Compartmentalizing the Data Store

Figure 4:
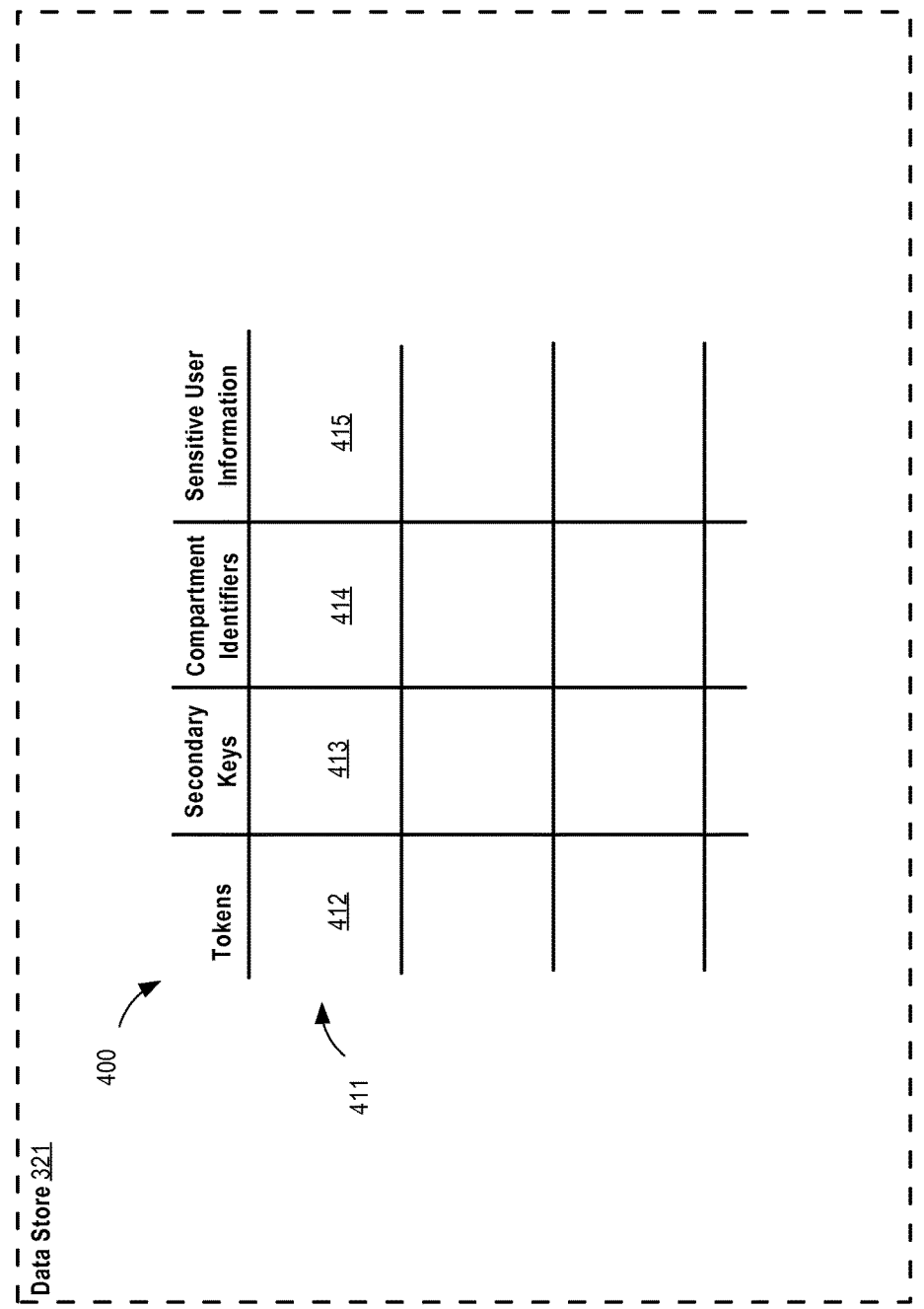
FIG. 4 is a block diagram illustrating compartmentalization of a data store for storing sensitive user information, according to some embodiments of the subject innovations.

Turning now to FIG. 4, it illustrates a technique for compartmentalizing the data store 321, according to some embodiments of the subject innovations. In particular, the data store 321 is structured as a table 400 with columns and rows. Table 400 may correspond to a table in a relational database or other type of database that stores data in tables.

The table 400 also has a number of columns including a "Tokens" column, a "Secondary Keys" column, a "Compartment Identifiers" column, and a "Sensitive User Information" column. The table 400 has a number of rows of which row 411 is an example. For example, in row 411, there is a value 412 in the Tokens column, a value 413 in the Secondary Keys column, a value 414 in the Compartment Identifiers column, and a value 415 in the Sensitive User Information.

Each row in table 400 may correspond to a successful STORE operation invoked by an application 313. For example, value 412 may be the Token returned to the application 313 by custodial web service 314 in response to the STORE operation. Value 413 may a Secondary Key specified by the application 313 in the STORE operation. Value 414 may a Compartment Identifier specified by the application 313 in the STORE operation. Value 415 may be based on a Sensitive User Information Value specified by the application 313 in the STORE operation. For example, value 415 may be a cryptographically encrypted form of the Sensitive User Information Value specified by the application 313 in the STORE operation.

The compartments 323 of the data store 321 are defined by the distinct values in the Compartment Identifiers column. In particular, all rows in the table 411 with same value in the Compartment Identifiers column all belong to the same compartment 323.

Sample Operation

Figure 5:
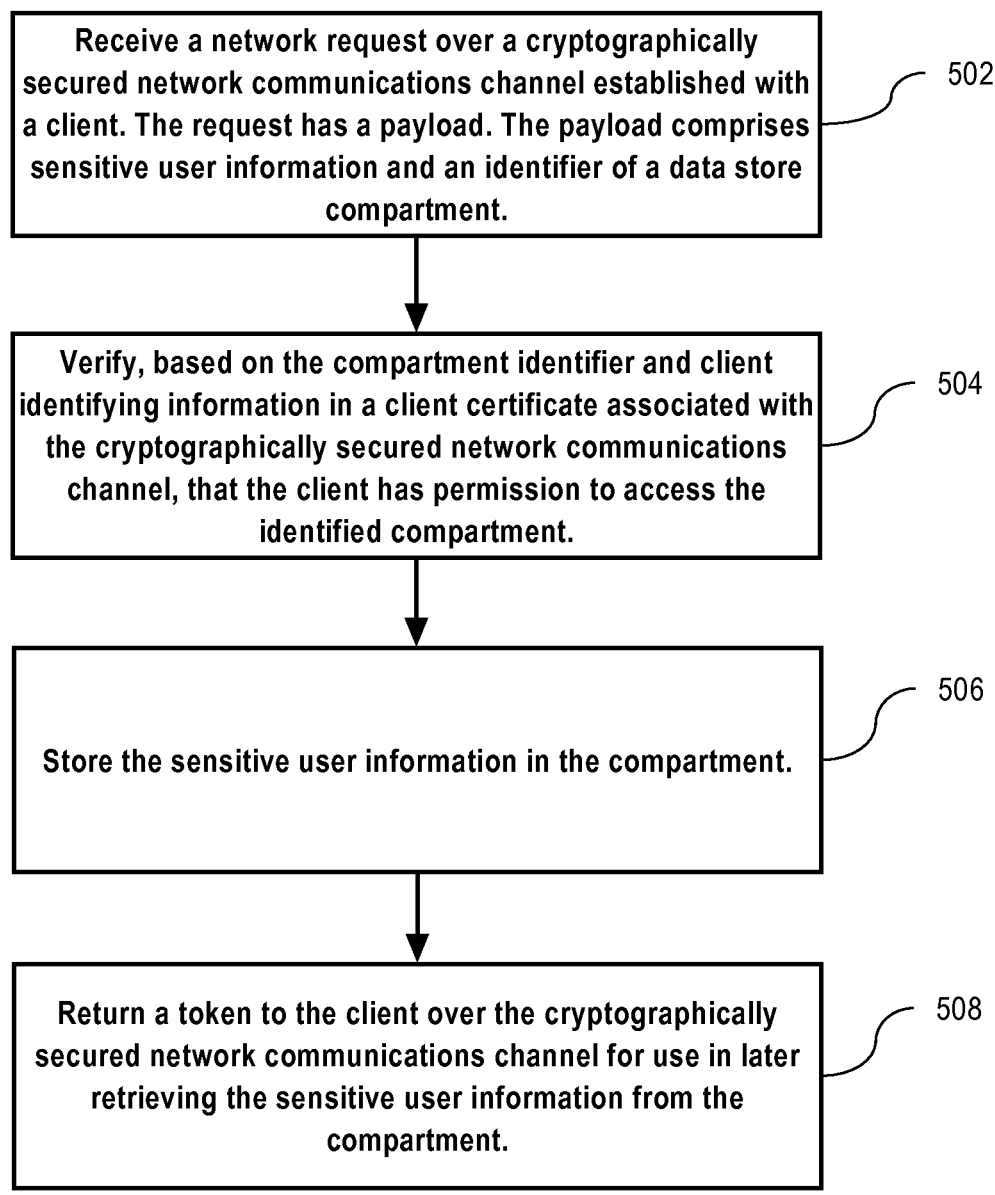
FIG. 5 is a flowchart of a process for storing sensitive user information, according to some embodiments of the subject innovations.
Figure 6:
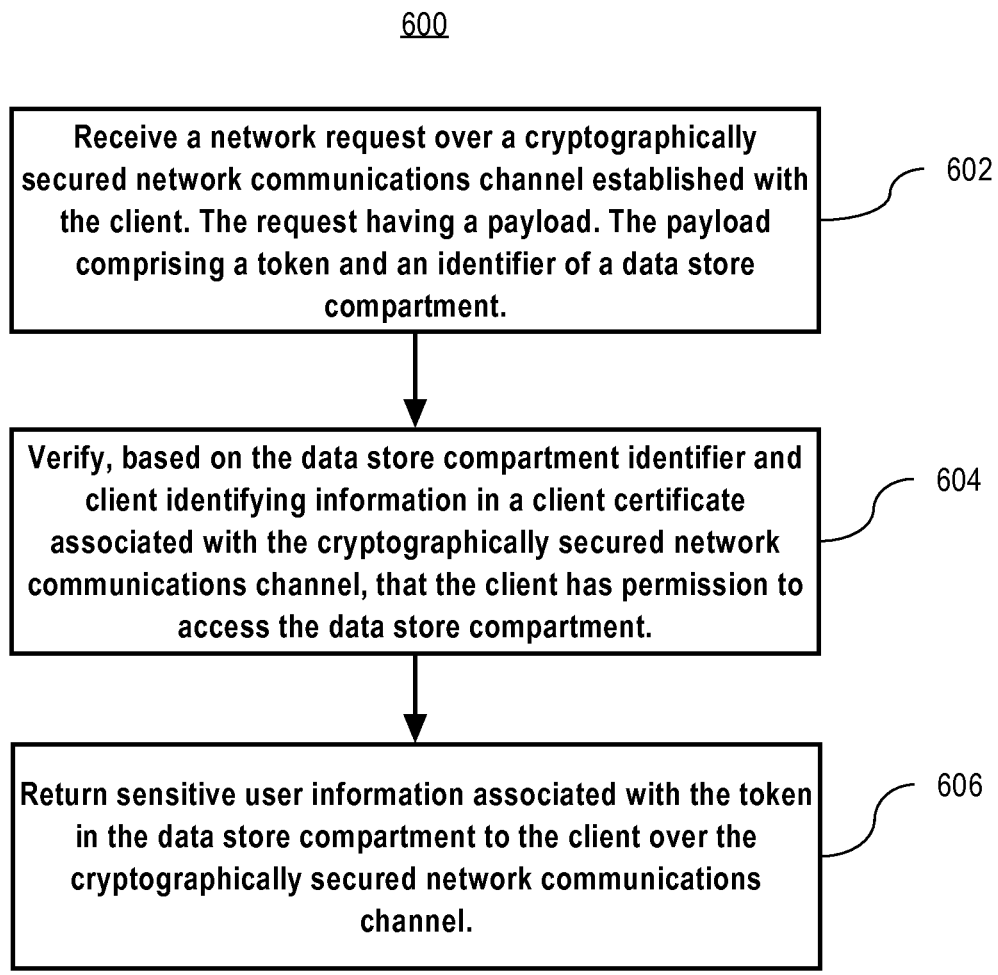
FIG. 6 is a flowchart of a process for retrieving sensitive user information, according to some embodiments of the subject innovations.

Turning now to FIGS. 5 and 6, they each comprise a flowchart illustrating a high-level method of operation of one or more computer servers such as, for example, one or more computer servers of online service 311. The following description presents method steps that may be implemented using computer-executable instructions, for directing operation of one or more devices under processor control. The computer-executable instructions may be stored on one or more computer-readable media, such as CD, DVD, hard disk, flash memory, or the like. The computer-executable instructions may also be stored as a set of downloadable computer-executable instructions, for example, for downloading and installation from an Internet location (e.g., Web server). The following discussion uses the operations of the system of the subject innovation in the networked computing environment 300 of FIG. 3 as an example, however a similar approach may also be used in other operating environments.

Sample STORE Operation

Turning first to FIG. 5, is a flowchart of a process for storing sensitive user information, according to some embodiments of the subject innovations.

At step 502, the custodial web service 315 receives a network request over a cryptographically secured network communications channel established with an application 313. The network request can be a HTTPS request that specifies the STORE operation discussed above. The cryptographically secured network communications channel between the application 313 and the custodial web service 315 can be based on SSL or TLS or other suitable cryptographic protocol suitable to provide communications security over the data network that connects the application 313 and the custodial web service 315. Preferably, the cryptographic protocol allows the custodial web service 315 to use a digital certificate presented by the application 313 and asymmetric cryptography to authenticate the application 313 and to negotiate a symmetric session key for use in cryptographically encrypting data sent via the cryptographically secured network communications channel.

The payload of the network request received at step 502 may also specify a sensitive user information value and a compartment identifier. The sensitive user information value received at step 502 may be encrypted by the application 313 using a symmetric encryption key that is private to the application 313 or at least unknown to the custodial web service 315. In some embodiments, the application 313 uses a shared software library that encapsulates the operations of cryptographically encrypting the sensitive user information before sending the cryptographically encrypted sensitive user information in the STORE operation request to the custodial web service 315. The shared software library may be used by multiple applications 313 to avoid code duplication and ensure consistency in the manner of client-side encryption of sensitive user information that is sent to the custodial web service 315 for storage. However, it is not a requirement of the subject innovations that the sensitive user information value be encrypted by the application 313 before sending the sensitive user information value to the custodial web service 315 in the network request.

The payload of the network request may also optionally specify a secondary key.

At step 504, the custodial web service 315 or the data store 321 verifies that the application 313 has permission to access the compartment 323 specified by the compartment identifier in the network request received at step 502. Such verification may be based on the compartment identifier and a service name and/or a network address in a digital certificate presented by the application 313 and used to establish the cryptographically secured network communications channel. The custodial web service 315 may merely verify the application 313 has permission to access the specified compartment 323. Alternatively, the custodial web service 315 may verify that the application 313 has permission to perform a STORE operation against the specified compartment 323. In either case, verification may involve consulting an access control list using the compartment identifier, the service name, and/or the network address.

At step 506, assuming access was successfully verified at step 504, the custodial web service 315 or the data store 321 stores the sensitive user information in the specified compartment 323. Storing the sensitive user information in the specified compartment 323 may involve storing the sensitive user information in a row of a table having at least a column for storing the sensitive user information and another column for storing the compartment identifier. The row may also store, possibly in a separate column of the row, the secondary key, if one was specified in the network request. The row may also store, possibly in a separate column of the row, a token generated by the custodial web service 315 or the data store 321 for the STORE operation.

According to some embodiments, storing the sensitive user information in the specified compartment 323 includes the custodial web service 315 or the data store 321 using a symmetric key algorithm to encrypt the sensitive user information and storing the encrypted sensitive user information in the specified compartment 323. This encrypting may be additional to any encryption that the application 313 applies to the sensitive user information before sending the sensitive user information to the custodial web service 315 in the network request received at step 502.

In some embodiments, the custodial web service 315 or the data store 321 uses an encryption key specific to the specified compartment 323 for encrypting the sensitive user information. In some embodiments, the custodial web service 315 or the data store 321 uses an encryption key that is global to all compartments 323 of the data store 321 (i.e., not specific to any one compartment 323 of the data store 321) for encrypting the sensitive user information. In some embodiments, the custodial web service 315 or the data store 321 uses an encryption key that is a combination of a compartment-specific encryption key and a global encryption key to encrypt the sensitive user information.

In some embodiments, the custodial web service 315 or the data store 321 generate a message authentication code (MAC) using a cryptographic hash function supplying the encrypted sensitive user information and the encryption key used to encrypt the sensitive user information as input to the cryptographic hash function. The MAC is then stored with the encrypted sensitive user information in the specified compartment 323. The MAC provides authenticity for the encrypted sensitive user information in addition to the privacy provided by encrypting the sensitive user information. In particular, before decrypting encrypted sensitive user information stored in the data store 321, the encrypted sensitive user information and the encryption key used to encrypt the sensitive user information can be input to the cryptographic hash function to generate a MAC. That MAC can be compared to the MAC stored in association with encrypted sensitive user information in the data store 321. If the MACs do not match, then the encrypted sensitive user information is not authenticated and will not be decrypted. Using MACs in this way can prevent chosen cipher text attacks on the system.

At step 508, the custodial web service 315 returns the token generated for the STORE operation to the application 313.

Sample RETRIEVE Operation

Turning now to FIG. 6, it is a flowchart of a process for accessing sensitive user information, according to some embodiments of the subject innovations.

At step 602, the custodial web service 315 receives a network request over a cryptographically secured network communications channel established with an application 313. The network request can be a HTTPS request that specifies the RETRIEVE operation discussed above. The cryptographically secured network communications channel between the application 313 and the custodial web service 315 can be based on SSL or TLS or other suitable cryptographic protocol suitable to provide communications security over the data network that connects the application 313 and the custodial web service 315. Preferably, the cryptographic protocol allows the custodial web service 315 to use a digital certificate presented by the application 313 and asymmetric cryptography to authenticate the application 313 and to negotiate a symmetric session key for use in cryptographically encrypting data sent via the cryptographically secured network communications channel.

The payload of the network request received at step 602 may specify a token returned in response to a prior STORE operation and a compartment identifier. Alternatively, the payload of may specify a secondary key instead of specifying a token.

At step 604, the custodial web service 315 or the data store 321 verifies that the application 313 has permission to access the compartment 323 specified by the compartment identifier in the network request received at step 602. Such verification may be based on the compartment identifier and a service name and/or a network address in a digital certificate presented by the application 313 and used to establish the cryptographically secured network communications channel. The custodial web service 315 may merely verify the application 313 has permission to access the specified compartment 323. Alternatively, the custodial web service 315 may verify that the application 313 has permission to perform a RETRIEVE operation against the specified compartment 323. In either case, verification may involve consulting an access control list using the compartment identifier, the service name, and/or the network address.

At step 606, assuming verification was successful, the specified compartment 323 is consulted for the requested sensitive user information. In particular, if a token is specified by the application 313, then the custodial web service 315 obtains the sensitive user information associated with that token in the specified compartment 323 of the data store 321. If, on the other hand, a secondary key is specified by the application 313, then the custodial web service 315 obtains all sensitive user information values associated with that secondary key in the specified compartment 323. In either case, obtaining the sensitive information value(s) from the data store 321 may include the custodial web service 315 and/or the data store 321 decrypting each of the encrypted sensitive user information value(s). Additional, if an encrypted sensitive user information value is associated with a MAC in the data store 321, then obtaining the sensitive information value from the data store 321 may involve the custodial web service 315 and/or the data store 321 computing a MAC for an authenticity check as described above. Assuming the encrypted sensitive user information value is authenticate, then the encrypted sensitive user information is decrypted and returned to the application 313 in response to the RETRIEVE operation.

EXTENSIONS AND ALTERNATIVES

While the invention is described in some detail with specific reference to exemplary embodiments and certain alternatives, there is no intent to limit the invention to those particular embodiments or those specific alternatives. For instance, those skilled in the art will appreciate that modifications may be made to the exemplary embodiments without departing from the teachings of the present invention.

The invention claimed is:

1. A method for storing sensitive user information for subsequent access by a client, the method performed by a computing system comprising one or more processors and memory, the method comprising:
   receiving a network request over a cryptographically secured network communications channel established with a client, the network request having a payload, the payload comprising the sensitive user information and an identifier of a target data store compartment in which to store the sensitive user information, wherein the client is an application of an online service that provides particular end-user functionality to users of the online service;
   wherein the target data store compartment is one of a plurality of data store compartments of a data store;
   wherein the data store comprises a database table;
   wherein each table row of the database table belongs to one data store compartment of the plurality of data store compartments;
   verifying, based on the target data store compartment identifier and client identifying information in a digital certificate presented by the client, that the client has permission to access the data store compartment;
   based on the verifying that the client has permission to access the data store compartment, storing the sensitive user information in the data store compartment;
   wherein the storing the sensitive user information in the target data store compartment is based on adding a new table row to the database table, the new table row comprising: (a) the target data store compartment identifier as a value in a first column of the new table row, (b) the sensitive user information as a value in a second column of the new table row, and (c) a token as a value in a third column of the new table row; and
   returning the token to the client over the cryptographically secured network communications channel for use to later retrieve the sensitive user information from the target data store compartment.

2. The method of claim 1, wherein the network request specifies an operation to perform against the data store compartment; and wherein verifying that the client has permission to access the data store compartment comprises verifying, based on the target data store compartment identifier and the client identifying information in the digital certificate presented by the client, that the client has permission to perform the operation against the data store compartment.

3. The method of claim 1, wherein the client identifying information in the digital certificate comprises a network address associated with the client.

4. The method of claim 1, wherein the client identifying information in the digital certificate comprises a service name associated with the client.

5. The method of claim 1, wherein storing the sensitive user information in the data store compartment comprises:
   encrypting the sensitive user information using a symmetric encryption algorithm to produce encrypted data; and
   storing the encrypted data in the target data store compartment.

6. The method of claim 1, wherein storing the sensitive user information in the target data store compartment comprises:
   encrypting the sensitive user information using an encryption key and a symmetric encryption algorithm to produce encrypted data;
   generating a message authentication code of the encrypted data using the encryption key and a cryptographic hash function; and
   storing the encrypted data in the target data store compartment in association with the message authentication code.

7. The method of claim 1, wherein the sensitive user information received in the network request is encrypted by the client.

8. The method of claim 1, further comprising:
   receiving an expiry time for the sensitive user information in the network request; and
   automatically deleting the sensitive user information from the target data store compartment after the expiry time.

9. A method for providing access to sensitive user information to a client, the method performed by a computing system comprising one or more processors and memory, the method comprising:
receiving a network request over a cryptographically secured network communications channel established with the client, the network request having a payload, the payload comprising a token and an identifier of a target data store compartment from which to retrieve the sensitive user information;
wherein the client is an application of an online service that provides particular end-user functionality to users of the online service;
wherein the target data store compartment is one of a plurality of data store compartments of a data store;
wherein the data store comprises a database table;
wherein each table row of the database table belongs to one data store compartment of the plurality of data store compartments;
verifying, based on the target data store compartment identifier and client identifying information in a digital certificate presented by the client, that the client has permission to access the target data store compartment;
based on the verifying that the client has permission to access the data store compartment, returning sensitive user information associated with the token in the target data store compartment to the client over the cryptographically secured network communications channel; and
wherein the sensitive user information is associated with the token by a particular row of the database table, the particular row comprising: (a) the target data store compartment identifier as a value in a first column of the particular row, (b) the sensitive user information as a value in a second column of the particular row, and (c) the token as a value in a third column of the particular row.

10. The method of claim 9, wherein the network request specifies an operation to perform against the data store compartment; and wherein verifying that the client has permission to access the data store compartment comprises verifying, based on the target data store compartment identifier and the client identifying information in the digital certificate associated with the cryptographically secured network communications channel presented by the client, that the client has permission to perform the operation against the target data store compartment.

11. The method of claim 9, wherein the client identifying information in the digital certificate comprises a network address associated with the client.

12. The method of claim 9, wherein the client identifying information in the digital certificate comprises a service name associated with the client.

13. The method of claim 9, wherein returning the sensitive user information to the client comprises:
decrypting encrypted sensitive user information associated with the token in the target data store compartment to produce decrypted data; and
wherein the sensitive user information returned to the client comprises the decrypted data.

14. The method of claim 13, further comprising:
prior to decrypting the encrypted sensitive user information associated with the token in the target data store compartment to produce the decrypted data, successfully verifying authenticity of the encrypted sensitive user information, based on a message authentication code associated with the encrypted sensitive user information in the target data store compartment.

15. The method of claim 9, wherein the network request is a Hypertext Transfer Protocol (HTTP) request or a HTTP-Secure (HTTPS) request.

16. A method for storing and providing access to sensitive user information, the method performed by a computing system comprising one or more processors and memory, the method comprising:
receiving a first network request over a first cryptographically secured network communications channel established with a first client, the first network request having a first payload, the first payload comprising the sensitive user information and an identifier of a target data store compartment in which to store the sensitive user information;
wherein the first client is an application of an online service that provides particular end-user functionality to users of the online service;
wherein the target data store compartment is one of a plurality of data store compartments of a data store;
wherein the data store comprises a database table;
wherein each table row of the database table belongs to one data store compartment of the plurality of data store compartments;
verifying, based on the target data store compartment identifier and client identifying information in a first digital certificate presented by the first client, that the first client has permission to access the target data store compartment;
storing the sensitive user information in the target data store compartment;
wherein the storing the sensitive user information in the target data store compartment is based on adding a new table row to the database table, the new table row comprising: (a) the target data store compartment identifier as a value in a first column of the new table row, (b) the sensitive user information as a value in a second column of the new table row, and (c) a token as a value in a third column of the new table row;
returning the token to the first client over the first cryptographically secured network communications channel for use in later retrieving the sensitive user information from the target data store compartment;
receiving a second network request over a second cryptographically secured network communications channel established with a second client, the second network request having a second payload, the second payload comprising the token and the identifier of the target data store compartment from which to retrieve the sensitive user information;
verifying, based on the target data store compartment identifier and client identifying information in a second digital certificate presented by the second client, that the second client has permission to access the target data store compartment;
returning the sensitive user information to the second client over the second cryptographically secured network communications channel; and
wherein the sensitive user information is associated with the token in the target data store compartment by the new table row added to the database table.

* * * * *